(12) United States Patent
King et al.

(10) Patent No.: US 7,489,595 B2
(45) Date of Patent: Feb. 10, 2009

(54) DIGITAL TIME CLOCK FOR OPERATION IN CONJUNCTION WITH MECHANICAL TIME CLOCK

(75) Inventors: Andrew E. King, Portland, OR (US); Korey Calmettes, Beaverton, OR (US)

(73) Assignee: Icon Time Systems, Inc., Beaverton, OR (US)

( * ) Notice: Subject to any disclaimer, the term of this patent is extended or adjusted under 35 U.S.C. 154(b) by 0 days.

(21) Appl. No.: 11/849,031

(22) Filed: Aug. 31, 2007

(65) Prior Publication Data

US 2008/0121691 A1    May 29, 2008

Related U.S. Application Data

(62) Division of application No. 11/564,814, filed on Nov. 29, 2006, now Pat. No. 7,266,048.

(51) Int. Cl.
*G04B 47/00* (2006.01)
*G06C 15/10* (2006.01)
*G06K 1/00* (2006.01)

(52) U.S. Cl. .......................... 368/10; 346/80; 235/377

(58) Field of Classification Search .................. 368/10, 368/41, 42, 46, 47; 235/377; 346/80–86; 702/35
See application file for complete search history.

(56) References Cited

U.S. PATENT DOCUMENTS

| | | | | |
|---|---|---|---|---|
| 4,270,043 A | * | 5/1981 | Baxter et al. | 235/419 |
| 4,516,138 A | * | 5/1985 | Iwasawa et al. | 346/80 |
| 4,538,056 A | * | 8/1985 | Young et al. | 235/377 |
| 4,755,835 A | * | 7/1988 | Ogihara et al. | 346/82 |
| 4,812,627 A | * | 3/1989 | Wexler et al. | 705/32 |
| 4,924,451 A | * | 5/1990 | Hsiung | 705/32 |
| 5,717,867 A | * | 2/1998 | Wynn et al. | 705/32 |

* cited by examiner

*Primary Examiner*—Vit W Miska
(74) *Attorney, Agent, or Firm*—Perkins Coie LLP

(57) ABSTRACT

A digital time clock that may be used in conjunction with a mechanical time clock. The digital time clock is placed on or adjacent to an existing mechanical time clock. A radio frequency identification (RFID) tag is associated with each time card that is distributed to employees. As an employee inserts a time card into the mechanical time clock, the digital time clock detects the proximity of the time card and reads the RFID tag. An RFID identifier is stored along with an indication of the time that the identifier was read. The digital time clock may be kept in a low-power standby state until the time card is detected, at which time the digital time clock enters an operational state. The digital time clock may be transported to a location where payroll is to be performed, and data downloaded to a processing device.

39 Claims, 5 Drawing Sheets

FIG. 4

DIGITAL TIME CLOCK FOR OPERATION IN CONJUNCTION WITH MECHANICAL TIME CLOCK

CROSS-REFERENCE TO RELATED APPLICATION

This application is a divisional of U.S. Ser. No. 11/564,814, filed Nov. 29, 2006, now U.S. Pat. No. 7,266,048, which is incorporated herein by reference in its entirety.

TECHNICAL FIELD

This invention relates to time and accounting systems, and more particularly, to time clock systems.

BACKGROUND

Mechanical time clocks have been utilized for over one hundred years to track the time and attendance of employees. While the technology used to implement mechanical time clocks has improved over the years, in many respects the operation of mechanical time clocks remains fundamentally the same. Each employee is provided a heavy paper card, often referred to as a time card, that is uniquely associated with the employee. When the employee arrives at their place of employ or other facility that relies on accurate recording of attendance, the employee inserts their time card into a time clock that contains an accurate time base. The insertion of the card causes a mechanically-actuated stamp to print time and date information on the employee's time card. The time cards are periodically collected by the employer, and the printed time and date information utilized by the employer to determine the time and attendance record of the employee. Such information is typically used by the employer to appropriately compensate the employee and as a measure of employee performance.

While mechanical time clocks have long been the most common form of time clock, digital time clocks are becoming increasingly popular. Digital time clocks are typically computer-based systems that may be used to track employee time. Rather than use a paper time card, in a digital time clock system the employee will enter an employee number, swipe a magnetic card through a reader, or otherwise use a technique that uniquely identifies the employee to the system (e.g., biometric identification). The advantages to the employer of using a digital time clock system can be significant. For example, the time and attendance data is already in digital form and can easily be manipulated to produce employee reports or process payroll. Since paper cards are no longer used, processing errors may be reduced as a result of lost or mishandled cards. Moreover, digital systems may be less prone to breaking down, and can be easily upgraded to accommodate new functionality.

Even though digital time clocks offer numerous advantages over mechanical time clocks, many employers are still hesitant to switch to a digital system. The reasons for not switching are varied and depend on the individual employer. For example, some employers may not want to switch because of the time and expense of replacing their existing mechanical system. Others may be hesitant to switch because they are uncomfortable with new technology and may question the reliability and accuracy of newer digital systems. Still other employers may be hesitant to switch because the logistics of training employees on how to use a new digital system can be too daunting. Since many of these employers would benefit from the features of digital time clocks if they could overcome their hesitation to adopt the technology, it would therefore be beneficial if there was a transitional or hybrid solution that would allow employers to continue to use their existing mechanical time clocks while at the same time receiving all of the benefits of a digital time clock system.

BRIEF DESCRIPTION OF THE DRAWINGS

FIG. 4 is a representative user interface of a software application that may be used to manage data recorded by the digital time clock.

DETAILED DESCRIPTION

Figure 1:
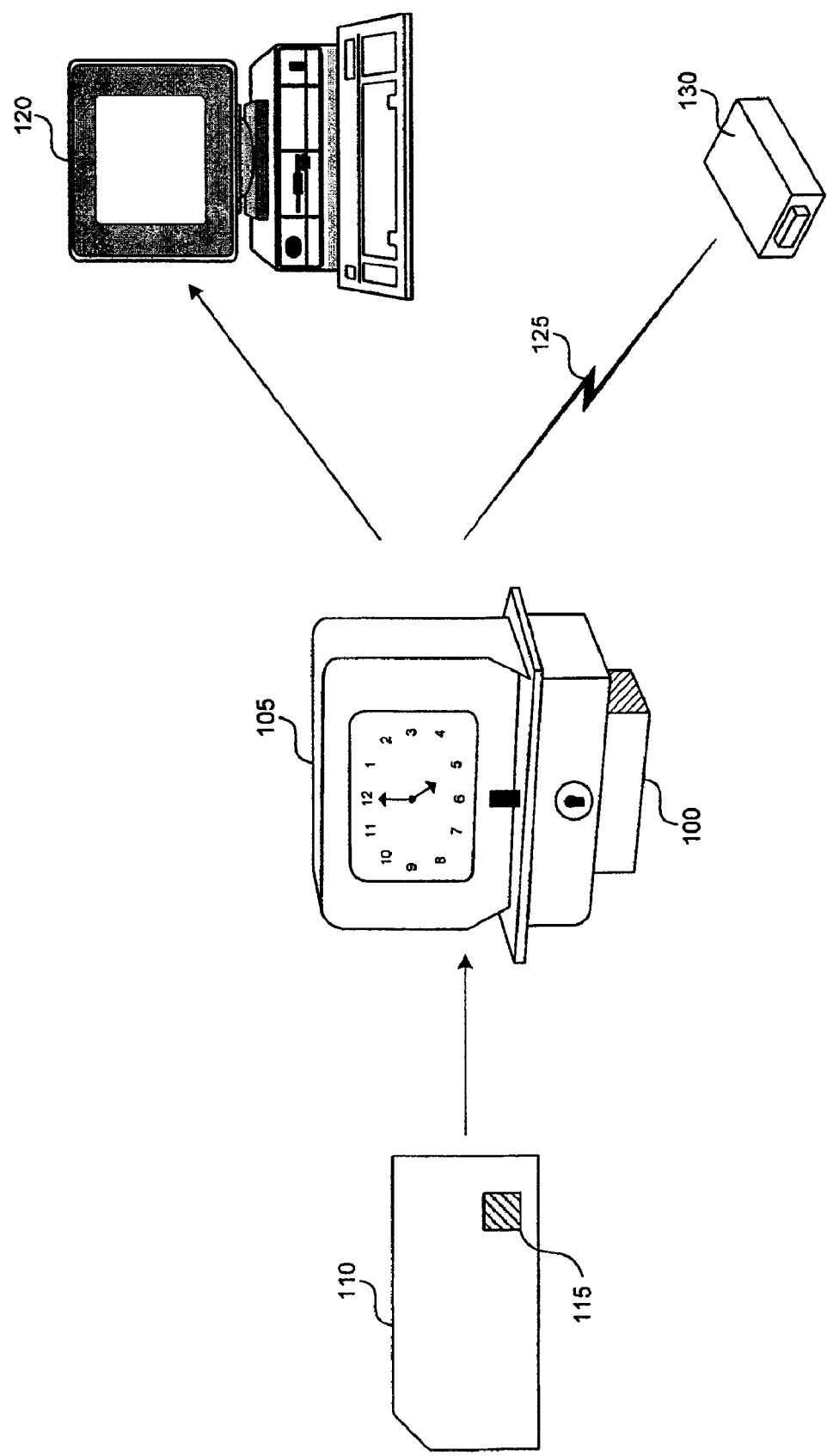
FIG. 1 is a perspective diagram of a digital time clock that may be used in conjunction with a mechanical time clock.

A digital time clock that may be used in conjunction with a mechanical time clock is disclosed. The digital time clock is a battery powered device that may be placed on or adjacent to an existing mechanical time clock. A radio frequency identification (RFID) tag is associated with each time card that is distributed to employees. As an employee inserts their time card into the mechanical time clock to "clock in" or "clock out," the digital time clock detects the proximity of the time card. Once the time card is detected, the digital time clock reads the RFID tag to determine the identity of the employee as reflected by the RFID identifier. The RFID identifier is stored along with an indication of the time that the identifier was read. At or around the time that the digital time clock is recording the time and attendance of the employee, the mechanical time clock is printing time and date information on the paper card of the employee. A duplicate time and attendance record is thereby created for the employee, with one record being stored in digital form by the digital time clock system and the other record being stored in printed form by the mechanical time clock system. The duplicate records are created automatically and in parallel, without having to provide an interface between the mechanical and the digital time clocks.

A card proximity detection circuit is provided in the digital time clock in order to detect when a time card is brought in proximity to the digital time clock. The digital time clock may be kept in a low-power standby state until the time card is detected. The digital time clock may then be brought to an operational state for a short period in order to read the RFID tag on the time card. The identity of the employee (as represented by the RFID tag identifier) and a time stamp is stored in memory by the digital time clock. The digital time clock is then returned to the standby state until the detection of the next time card. By cycling between a low-power standby state and a normal power operational state, the power used by the digital time clock is minimized. Minimizing power use prolongs battery life and extends the lifespan of the digital time clock.

In some embodiments, the digital time clock is attached on or near to the mechanical time clock in a fashion that allows the digital time clock to be periodically removed from the location where it is installed. Once removed, the digital time clock may be transported to a location where payroll or other processing is to be performed. The digital time clock is connected to a computer or other processing means, and the data stored in the digital time clock downloaded to the computer for analysis and manipulation. The digital time clock may then be reinstalled at the location of the mechanical time clock. A lock or other security means may be used to ensure that only authorized representatives are allowed to remove and transport the digital time clock.

In some embodiments, easy to use software is provided on the computer or other processing system that receives the downloaded time and attendance data from the digital time clock. In order to help employers manage the time and attendance data on the computer system, a user interface is provided that allows the downloaded data to be viewed as if the data were printed on time cards. These "virtual" time cards that are displayed to the employer on the computer monitor ease the transition to using a digital time clock, as the employer is presented with an interface (i.e., an electronic version of a time card) that they are already very comfortable with using.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

FIG. 1 is a perspective view of an environment in which a digital time clock 100 may be used. The digital time clock 100 is attached on, adjacent to, or embedded within a mechanical time clock 105. In FIG. 1, the digital time clock is depicted as being attached on the bottom of the mechanical time clock, but in practice the digital time clock may be attached to the top, the back, or the right or left sides of the mechanical time clock. The digital time clock may also be attached to the wall or other support fixture (not shown) to which the mechanical time clock is affixed. For example, the digital time clock may be located on a wall or support fixture above, below, behind, or to either side of the mechanical time clock. The digital time clock may also be embedded within the mechanical time clock, such as within the case of the mechanical time clock or as a module that is removable from the mechanical time clock. As will be appreciated from the discussion herein, the digital time clock 100 merely needs to be in close enough proximity to the mechanical time clock 105 so that the digital time clock can detect when a paper or other physical time card 110 is, or is about to be, inserted into the mechanical time clock 105.

When a time card 110 is inserted by an employee into the mechanical time clock 105, time and attendance information is printed on the time card 110 by the mechanical time clock in a manner well known to those skilled in the art. At or around the time that the mechanical time clock is printing time and attendance information on the time card, the digital time clock reads a radio frequency identification (RFID) tag 115 that has been placed on the time card. The RFID tag contains an identifier that associates the time card 110 with an employee. By reading the identifier from the RFID tag, the digital time clock is thereby able to digitally store time and attendance information associated with that employee in a memory contained in the digital time clock. The time and attendance information stored by the digital time clock is created at or near the same time as the time and attendance information is printed by the mechanical time clock, and may be considered to be a duplicate record of the time and attendance of the employee. The information stored on the printed time card and the information stored in the digital memory may be correlated as described below.

Time cards 110 may be purchased by the employer from a supplier with the RFID tags 115 already pre-applied to the cards. Alternatively, the employer may be able to purchase a quantity of RFID tags and apply the tags to time cards that have been separately acquired. The RFID tags may be single use (e.g., a sticker that may be applied to a time card) or multiple use (e.g., a plastic fob that may be temporarily attached to a time card and moved between time cards). In some embodiments, the RFID tags 115 may be read-only tags, in which case the identifier that is stored in each RFID tag is determined by the manufacturer of the RFID tags. In some embodiments, the RFID tags may be read/write tags, or tags from which stored data may be read and to which new data may be written. If the RFID tags are read/write tags, the identifier that is stored in each RFID tag may be determined by the manufacturer of the RFID tags or may be stored by the employer. The employer maintains a table or other database that correlates the RFID tag identifier with the employee to which the time card is distributed. The table or other database may be constructed before the time cards 110 are distributed to employees, or after the time cards have been collected from employees. In this fashion, the employer is able to quickly correlate time and attendance information with the appropriate employee by comparing the identifiers that are read from the RFID tags with the maintained table or other database.

On a periodic basis, usually once every pay period, the physical time cards 110 may be collected by the employer and the information on the cards used to process the payroll or other time and attendance function. As those skilled in the art will appreciate, the processing of time cards is largely a manual process to derive the necessary employment statistics for each employee. In a similar manner, on a periodic basis, the information that is stored in the digital time clock 100 may be downloaded and processed in order to determine the employment statistics for each employee. In some embodiments, the digital time clock 100 is secured at or near to the mechanical time clock in a fashion that allows the digital time clock 100 to be removed and transported to a computer 120 or other processing device where the data may be downloaded. For example, the digital time clock may be secured by a releasable mount, with screws, with Velcro, or with any other attaching mechanism that allows the digital time clock to be removed from the location where it is mounted and transported to the processing location. Any of the attaching mechanisms for the digital time clock may include a key or other security feature that prevents the time clock from being removed from its mounting location by unauthorized users (i.e., by those that don't have lawful access to the key or security code, password, etc.)

When the digital time clock 100 has been removed from its mounting location, it may be transported to the computer 120 or other processing device where the data may be downloaded from the digital time clock. As will be described herein, the digital time clock may be connected to the computer via a USB port, Ethernet port, or other communication interface. Data within the digital time clock is then downloaded for further processing by the computer. For example, the data may be used by the computer to process the payroll and pay employees, keep track of used vacation or sick time, etc. Once the data has been downloaded, the memory of the digital time clock is cleared of accumulated and stored data. The digital time clock may then be returned to its mounting location next to the mechanical time clock to continue to record employee time and attendance data.

During the period that the digital time clock 100 is not on or near to the mechanical time clock, those skilled in the art will appreciate that no time and attendance data will be captured and stored by the digital time clock for any employees entering or leaving during this period. The impact of such disruption to data collection is minimized by the fact that the mechanical time card system will continue to operate during the period that the digital time clock is absent, so the time and attendance data for employees will still be maintained on the physical time cards during the period. The impact of such disruption to data collection may also be minimized by scheduling the time when the digital time clock is removed for those hours when the employee are typically not present (e.g., such as after closing or between shifts). Such disruption may also by minimized by maintaining two digital data clocks, and replacing the first digital time clock with the second digital time clock when the first digital time clock is removed, and vice-versa.

In some embodiments, the digital time clock 100 may be connected to the computer 120 or other processing device with a wired or wireless network. When connected to the computer via a wired or wireless network, data from the digital time clock may, on a periodic basis or on a continuous basis, be transmitted to the computer and stored for processing. In such a case, the digital time clock would not need to be removed from its location adjacent to the mechanical time clock. The digital time clock may therefore be mounted in a more secure fashion than that contemplated by a removable mount.

In some embodiments, a portable reader device (not shown) may be carried by an employer and connected to the digital time clock 100 using a wired or wireless connection. The communication connection may be established without removing the digital time clock from its location adjacent to the mechanical time clock. Once the connection is established, data may be downloaded from the digital time clock to the portable reader device. The portable reader device is then transported by the employer and connected to the computer 120 using a wired or wireless connection. The portable reader device downloads the time and attendance data from the digital time clock to the computer 120, where it may be processed as previously described.

In response to the collection of time and attendance data, the digital time clock 100 may also transmit a wired or wireless trigger signal 125 to a remote control device 130. The remote control device may be connected to actuators, locks, or other control mechanisms to implement a desired function when the wireless trigger signal is received. For example, the remote control device 130 may be connected to an electronically-lockable door that is configured to remain locked until an employee has appropriately clocked in or clocked out of the time clock. The digital time clock 100 may therefore send an appropriate trigger signal to the remote control device when the digital time clock records a valid time and attendance record for an employee.

Figure 2:
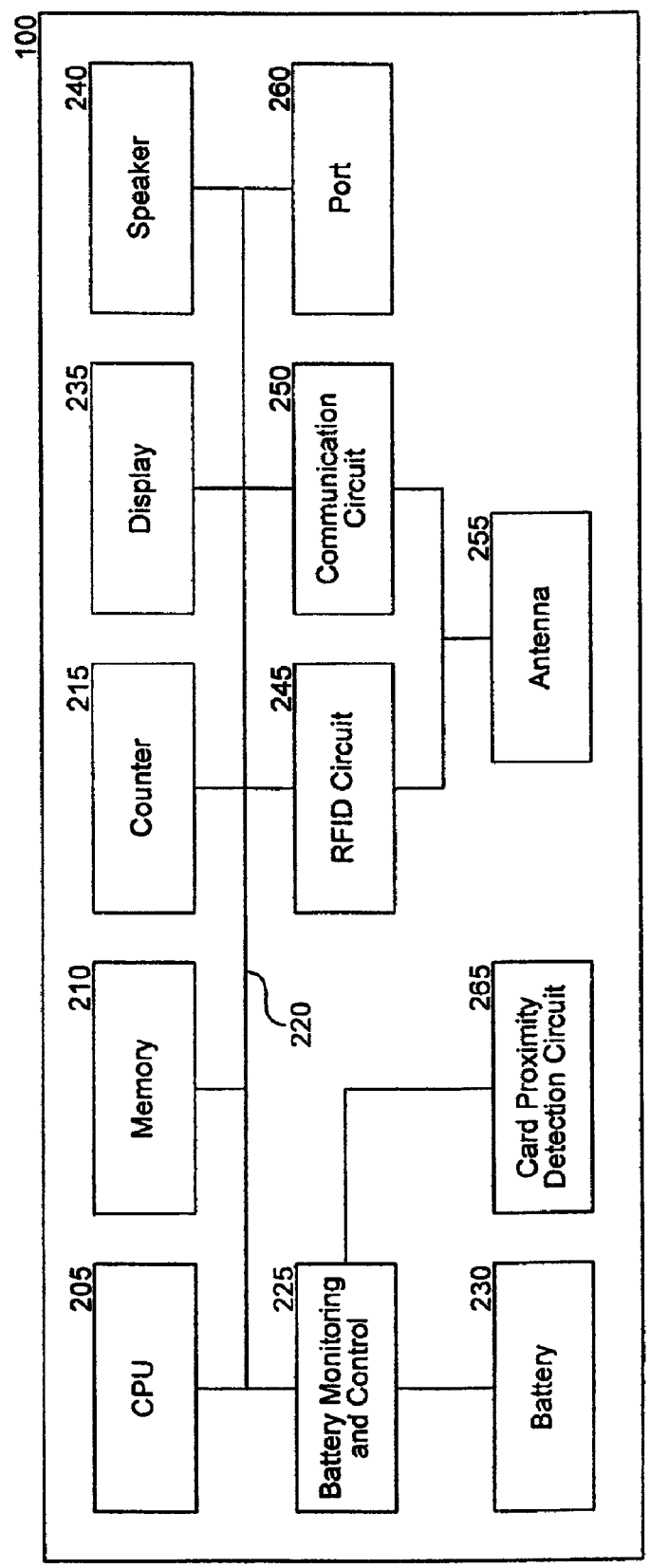
FIG. 2 is a block diagram of a hardware architecture for the digital time clock.

FIG. 2 is a block diagram of a representative hardware architecture for the digital time clock 100. A central processing unit (CPU) 205 and memory 210 are coupled by a bus 220. The memory may be non-volatile or volatile storage such as flash memory, RAM, ROM, magnetic computer storage devices such as hard disks, or other types of memory. One or more application programs are stored within the memory and executed by the CPU and other components in order to implement the functionality described herein. A counter 215 is coupled to the bus and provides a time base that is used as the basis to record a time and attendance event of an employee. In some embodiments, the counter is a 16-bit counter that increments one count every minute in all operating modes. That is, the counter continues to increment whether the digital time clock is in a low-power standby mode or in an operational mode as described below. The counter may also continue to increment for a short period even if power to the time clock is interrupted (e.g., when batteries contained in the time clock are changed).

Various components are provided to provide status and other information to an employee using the digital time clock 100 or to an employer that operates the digital time clock. A display 235 and/or a speaker 240 are coupled to the bus 220. The display may comprise one or more LEDs that indicate to an employee when a time card has been detected and the RFID tag on the time card read. For example, a green LED may flash when the digital time clock detects and reads an RFID identifier without error, and a red LED may flash when a time card is detected but a valid identifier is not read. Alternatively or in addition to the LEDs, the display may comprise an LCD or other display panel that provides a textual or graphical display to an employee to indicate the detection and reading of the time card without error. The same or a different display may also be used to convey information to the employer. One or more buttons or switches (not shown) may be included that, when depressed or selected, allow the employer to check the proper operation of the digital time clock or the status of the time clock. For example depressing a particular combination of buttons may instruct the digital time clock to indicate the amount of remaining memory space in the time clock, the number of recorded time and attendance events since the installation of the time clock, or any other statistical pieces of information that would be beneficial to the employer.

A radio frequency identification (RFID) circuit 245 is coupled to the bus 220 and to an antenna 255 to enable the digital time clock to read RFID tags. The RFID circuit 245 allows the digital time clock to read identification numbers from passive RFID tags by transmitting a radio frequency signal over the antenna and detecting the backscattered signal from the tag. If active RFID tags are utilized by an employer, the RFID circuit 245 may also be capable of transmitting to and receiving signals from the active tag, and directing the active tag to store one or more pieces of data that is transmitted from the digital time clock.

Several components are provided in the digital time clock 100 to allow the time clock to communicate with computers or other devices that are external to the time clock. A communication circuit 250 that is coupled to the bus 220 and to the antenna 255 may be used in a variety of contexts. In some embodiments, the communication circuit is used to transmit data stored in the digital time clock to an external device, such as a computer via a wireless network or to a portable reader device. In some embodiments, the communication circuit may be used transmit a trigger signal to a remote control device 130. Those skilled in the art will appreciate that one or more antennas may be required depending on the particular communication frequencies that are being utilized. Additionally, a port 260 such as a USB port or an Ethernet port may be coupled to the bus 220. The digital time clock may communicate with computers or other devices that are connected via the port 260.

Power is provided to the digital time clock 100 by one or more batteries 230. Batteries may be rechargeable batteries or replaceable batteries, or the time clock may be constructed in such a way that the entire time clock is designed to be replaced when the batteries are depleted. A battery monitoring and control module 225 is coupled to the batteries to monitor the overall state of the batteries. In order to maximize battery longevity, the digital time clock is preferably kept in a low-power standby state until a time card 110 is detected in proximity to the time clock. When a time card is detected, the digital time clock is brought to an operational state for a short period of time in order to read the RFID tag on the time card. The transition between the low-power standby state and the operational state may be controlled by the battery monitoring and control module 225 based on a signal received from a card proximity detection circuit 265.

A variety of technologies may be used to implement the card proximity detection circuit 265, depending on the environmental conditions in which the digital time clock is to be operated. For example, a photosensor may be added to the time clock and oriented in such a way that the photosensor will be shielded from ambient light when a time card is being inserted into the mechanical time clock. When a drop in light is detected, the card proximity detection circuit 265 may assume that a time card is being inserted and send a signal to the battery monitoring and control module 225 to cause the digital time clock to return to the operational state. As another example, a small light or sound transponder may be provided to transmit a signal and detect an echo of light or sound waves from a time card. As still another example, a mechanical switch may be provided and oriented in such a way that the insertion of a time card into the mechanical time clock will trigger the operation of the switch. As yet another example, an inductive sensor may be provided that detects the motion of actuators or the operation of other components within the mechanical time clock. Any technology may be used that enables the card proximity detection circuit 265 to detect the proximity of the time card in a reliable fashion. The handling of errors in detecting the proximity of a time card are discussed in greater detail with respect to FIGS. 3A-3B below.

Those skilled in the art will appreciate that the card proximity detection circuit 265 may be omitted if battery life is not a concern or if the trade off in cost or performance is insufficient to justify switching between a standby state and an operational state. For example, it may be possible to utilize components that operate at a sufficiently low power to enable the operational lifespan of the digital time clock to be extended without having to rely on entering a standby state. Alternatively, the inherent operation of the time clock may cause the batteries to be charged on a frequent basis (e.g., such as when coupled to a computer to allow downloading of data from the time clock), thereby minimizing the importance of power management.

Figure 3A:
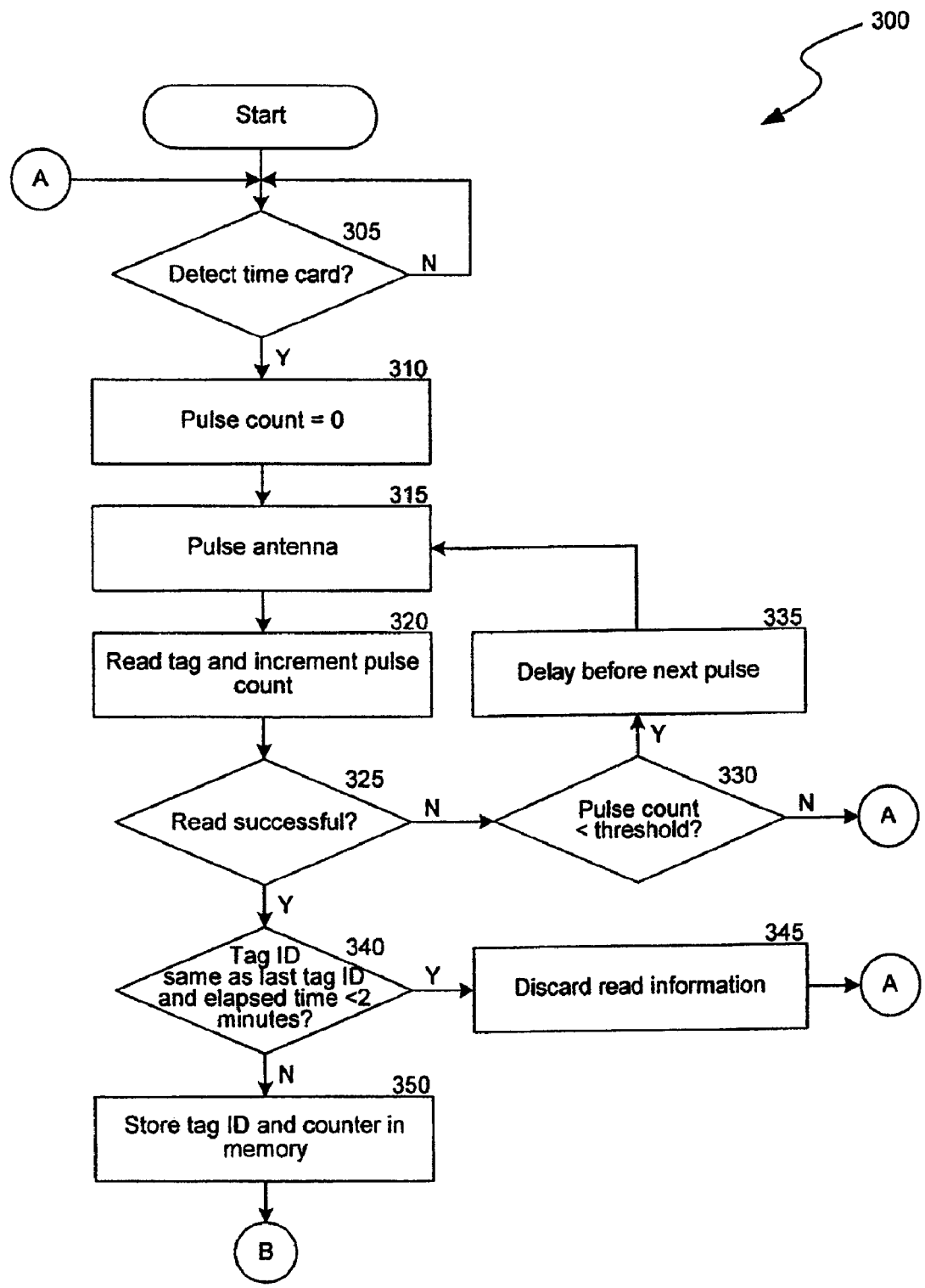
FIGS. 3A and 3B are flow charts of a method for detecting and recording time and date information associated with time cards that are brought in proximity to the digital time clock.
Figure 3B:
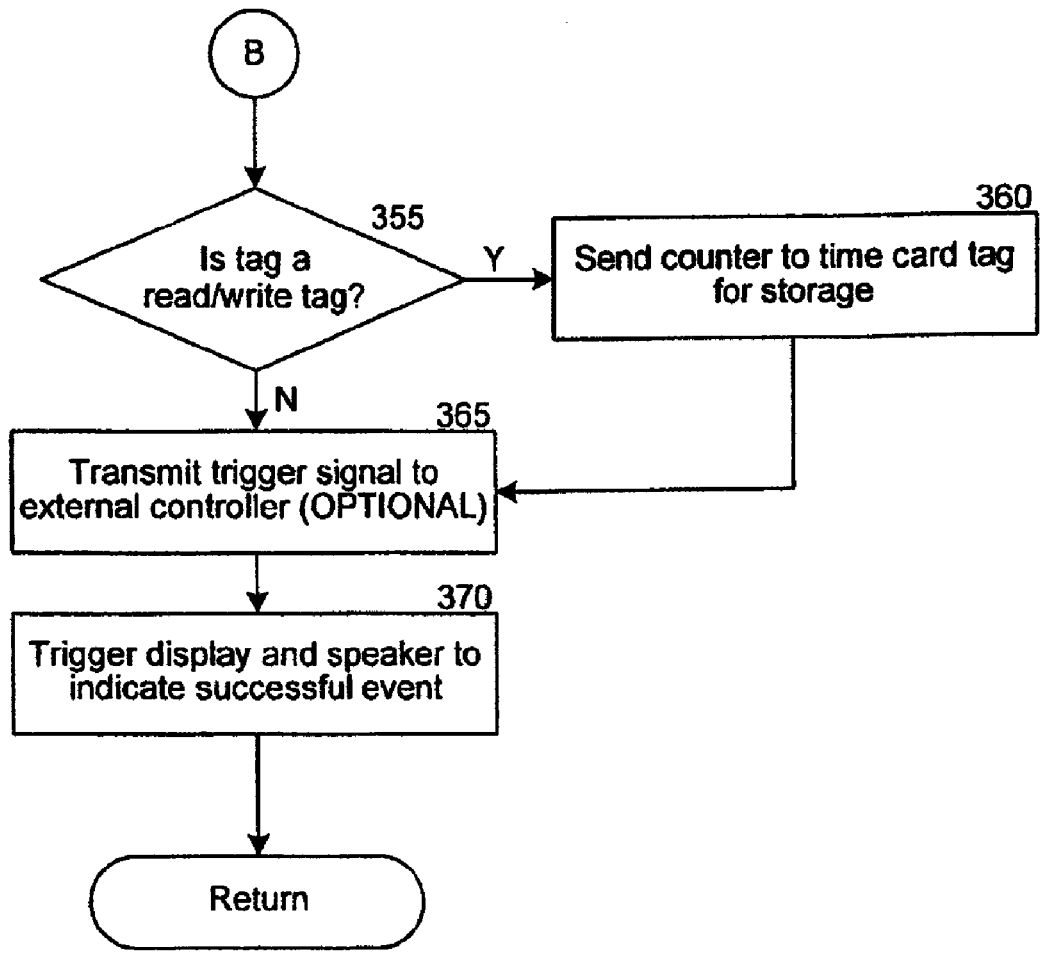

FIGS. 3A and 3B are flow charts of a process 300 for reading an RFID tag and storing the read data for subsequent processing. At a decision block 305, the digital time clock detects that a time card is in close proximity to the time clock. As was previously described with respect to the card proximity detection circuit 265, various technologies may be used to detect the presence of a time card. If a time card is detected, processing continues to a block 310 where a pulse counter is set to zero. The pulse counter is used to track the number of attempts that are made to read an RFID tag. Because of the nature of the operating environment, the card proximity detection circuit 265 may periodically report false detection events. For example, the detection circuit may incorrectly believe that a time card is present if an employee brushes up against the digital time clock. As another example, the detection circuit may correctly detect the presence of a time card, but an employee may drop the time card before it can be read or inserted into the mechanical time clock system. Rather than continuously attempting to detect the RFID tag and depleting the batteries, the digital time clock therefore makes a fixed number of attempts to read the RFID tag. If the RFID tag is not read by the time that the fixed number of attempts is complete, it is presumed that the original signal from the card proximity detection circuit was generated in error or that the proffered time card does not have the correct type of RFID tag.

At a block 315, the RFID circuit 245 pulses the antenna 255 to send a signal that will induce a response from an RFID tag 115. At a block 320, the RFID circuit attempts to detect the response from the RFID tag. In this particular application, the response typically includes a unique identifier that associates the time card with a particular employee. Additional information, however, may also be encoded in the RFID tag, such as a particular group or division that the employee is associated with. At block 320, the pulse count is also incremented to indicate that an initial read attempt has been made to detect the RFID tag.

At a decision block 325, the digital time clock determines whether the read of the RFID tag was successful. A read is successful if a unique identifier having a desired format is read from the RFID tag. (In some embodiments, it may be necessary for two or more reads to detect the same unique identifier for the digital time clock to judge that the read has been successful.) If the read was not successful, at a decision block 330, a test is made by the digital time clock to determine whether the pulse count has exceeded the threshold number of read attempts that have been determined to be sufficient for the operating environment. For example, in certain environments the threshold may be set at three attempts, and the digital time clock will cease read attempts if three pulses have been emitted without successfully reading the RFID tag. In other environments, the threshold may be set at five attempts, and the digital time clock will cease read attempts if five pulses have been emitted without successfully reading the RFID tag. If the pulse count has exceeded the set threshold without a successful read, the process returns to decision block 305 where the digital time clock waits to detect the next time card. If the pulse count has not exceeded the set threshold, processing continues to block 335 where a delay between pulses is introduced. Such a delay may vary depending on the anticipated speed that an employee will move the time card, but typically is 0.5 seconds or less. After the delay, another pulse is made on the antenna at block 315 and another attempt is made to read the RFID tag.

If the RFID tag is successfully read, at a decision block 340 a test is made by the digital time clock to determine whether the same time card has been read twice in close succession. Such an error may occur, for example, if an employee leaves their time card in or near the mechanical time clock for a longer than normal period. To test for the duplicate reading of the same time card, a test is performed at decision block 340 to determine whether (i) the identifier read from the RFID tag is the same identifier that was previously read, and (ii) less than two minutes have elapsed. The reading of the same identifier from a time card twice in such short succession is presumed to be in error. If the same identifier was read twice within the last two minutes, at a block 345 the data pertaining to the second reading of the identifier is discarded. Processing then continues at decision block 305 where the digital time clock waits to detect the next time card.

If the same identifier was not read twice in the last two minutes, processing continues to block 350. At block 350, the digital time clock stores the RFID tag identifier in memory 210 along with the value of the counter 215. As was described above, the counter is a time that increments once each minute regardless of whether the digital time clock is in a standby state or in an operational state. The value of the counter that is stored is therefore reflective of the time that the time card was inserted into the mechanical time clock. The process of subsequently reconciling the value of the counter with the time maintained by the mechanical time clock will be described with respect to FIG. 4.

At decision block 355, a test is made by the digital time clock to determine whether the RFID tag is a read/write tag. Such a determination can typically be made by decoding information that is read from the RFID tag. If the RFID tag is a read/write tag, at a block 360 the value of the counter 215 is transmitted to the RFID tag for storage in the tag. By storing the counter value in the RFID tag, two records of the employee's time and attendance events are maintained by the time card. The first record is the information mechanically printed on the time card by the mechanical time clock. The second record is the information digitally stored in the RFID tag by the digital time clock.

At a block 365, a trigger signal is optionally transmitted by the digital time clock to a remote control device 130. As was previously discussed, such a trigger signal may cause a door to be unlocked, a camera to be enabled, or any other process to be initiated that an employer may want to be tied to the clocking in or clocking out of an employee.

At a block 370, the display 235 and/or speaker 240 are controlled by the digital time clock to indicate a successful event, e.g., the detection and reading of an RFID tag. Various audible and visual cues may be given to employees depending on the desired amount of instruction. Once an RFID tag has been successfully read, stored, and messaged, processing continues to decision block 305 where the digital time clock waits to detect the next time card.

Figure 4:
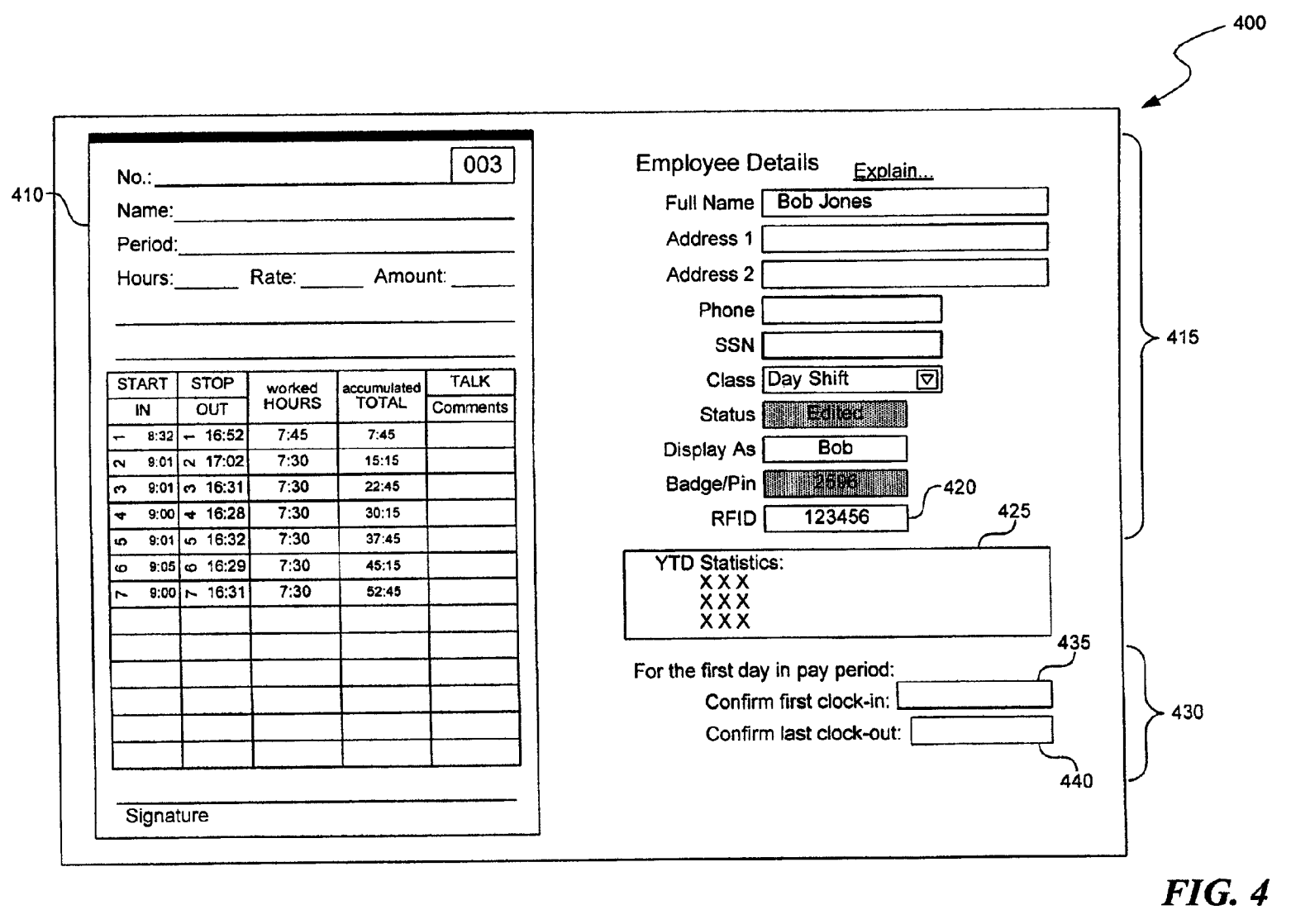

On a periodic basis, the information that is stored in the digital time clock 100 may be downloaded and processed in order to calculate the necessary payroll and employment statistics for each employee. As was previously described, various methods may be used to transfer data from the digital time clock to a computer, such as physical transport and connection to the computer, wired or wireless network transfer to the computer, or the user of a portable reader device. Once the data has been transferred to a computer or other processing device, various interfaces may be provided to the employer to allow the employer to manipulate the data. FIG. 4 is an example of a representative user interface 400 for an application, such as a payroll processing application, that may be used by an employer to view and/or manipulate the data downloaded from the digital time clock. Although the interface is indicated as being accessed using a dedicated software application, the interface may also be incorporated in a standard browser application, such as Internet Explorer or Firefox.

The user interface 400 is divided into a number of regions for presentation of data to the employer. In the first region, the time and attendance data is displayed to the user in the form of a "virtual" time card 410. That is, a graphical display of a time card is displayed to the employer, with time and attendance data that was downloaded from the digital time clock displayed on the time card as if it had been imprinted on the time card by a mechanical time clock. The employer may be given an option of selecting a desired format of time card that matches a format of the time card that is used by the employer. The display of the virtual time card 410 will then be changed to match the physical time card of the employer. Displaying the data on a virtual time card serves a number of purposes. For example, employers that are not very familiar with computers or computer applications are presented with a visual interface that they can readily understand based on their prior experience with mechanical time clocks. Employers are also able to more readily compare the virtual time card 410 with the corresponding mechanically-stamped time card 110 that is also in the employer's possession. Displaying virtual time cards therefore makes it much easier for employers to ultimately transition from a mechanical time card system to a digital time card system.

In a second region 415 of the user interface, the employer is presented with stored information about the employee, including the employee's name, address, phone number, and various other details. In particular, a RFID identifier field 420 is provided to allow the employer to input the identifier of the RFID tag that was placed on the employee's time card. By entering the identifier, a correlation is made between the employee's information and the particular time card that the employee is using. Alternatively, an RFID tag identifier may be automatically assigned by an application used by the employer without requiring the employer to manually enter the identifier. For example, a scanning system may be provided that allows each of the time cards to be scanned or read and the identifier on the RFID tag correlated with the identity of the employee. As another example, each time card may be printed with a number that is correlated with the RFID tag identifier associated with that time card. In such circumstances, the employer would enter the time card number for an employee, and the application would automatically associate the RFID tag identifier with that employee based on a look-up table provided by the time card manufacturer. When an RFID identifier is automatically assigned using these or similar techniques, it may not be necessary to display the actual RFID identifier in identifier field 420.

In a third region 425 of the user interface, the employer is presented with various payroll statistics of the employee, such as total hours worked to date, aggregate amount paid, etc. The amount of statistics and the period over which the statistics are computed may be selected by the employer.

In order to reconcile the counter values that are stored in the memory of the digital time clock with the time values that are mechanically recorded on the time card, a fourth region 430 may be provided on the user interface for one or more employees. In the fourth region, the employer is asked to manually enter information that is contained on the employee's time card 110. In a field 435, the employer is asked to enter the first clock-in time on the employee's time card. In a field 440, the employer is asked to enter the last clock-out time on the employee's time card. When the payroll processing application receives manually entered values for the first clock-in time and the last clock-out time, it can correlate those actual clock times with the stored counter values that are associated with the first clock-in and the last clock-out as recorded by the digital time clock. Since the counter is consistently incremented in 1-minute increments, all other values of the counter may be then be translated into the appropriate time and date by the system. Those skilled in the art will appreciate that the questions in the fourth region need only be answered by the employer for a single employee in any pay period, as once correlated, the correlation may be used by the payroll application for all other employee data that was recorded during that period.

In some embodiments, the fourth region may be presented to the employer on a periodic basis, such as in the first screen that the employer sees upon entering the application to process payroll or once for each calendar week for which the application receives data. By requiring the employer to confirm one or more clock-in or clock-out times for one or more employees on a periodic basis, the application is able to maintain a desired degree of accuracy between the time represented by the counter and the time reflected by the mechanical time clock.

In some embodiments, the fourth region may be omitted in its entirely and the correlation determined based on a local clock that is maintained by the computer running the payroll processing application. When the information stored in the digital time clock 100 is downloaded to a computer for processing, a counter value reflective of the time at download may be transferred from the digital time clock in addition to the time and attendance data. By comparing the received counter value with the value of a local clock maintained by the computer, an initial correlation of counter value to mechanical time clock value may be made. The employer may be presented with employee time and attendance data based on this initial correlation, and allowed to refine the correlation to account for any difference between the time maintained by the computer and the time maintained by the mechanical time clock.

It will be appreciated that the disclosed digital time clock allows employers to continue to use their existing mechanical time clocks while at the same time receiving all of the benefits of a digital time clock system. Such a time clock is therefore particularly beneficial to those employers that are interested in slowly transitioning to a digital system, but may initially be skeptical of the technology.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while RFID technologies are discussed herein, the disclosed system and method is equally applicable to any wireless technology that allows an identifier to be read remotely. As another example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the methods and system provided herein can be applied to other systems, not necessarily the system described above. The elements and operation of the various embodiments described above can be combined to provide further embodiments. For example, while the disclosed technology may be favorably used to improve the performance of digital time clocks, those skilled in the art will appreciate that the technology is equally applicable to any RFID reading device that would benefit from low-power operation. The card proximity detection circuit 265 may be adapted to detect any tangible item that is brought into proximity with the reading device. Once a tangible item is detected, the reading device may be brought from a low-power quiescent state to an operational state for a short period of time in order to attempt to read an RFID tag on the tangible item. After an RFID tag has been read or a timeout period has elapsed, the reading device may be returned to the low-power quiescent state until the next tangible item is detected. By cycling to an operational state only when a tangible item is detected, the power consumption of the reading device is reduced. Such technology is therefore particularly applicable for battery-operated RFID tag readers.

As another example, with little modification the disclosed digital time clock may also be used to read time cards that carry identification information in a manner other than RFID tags. For example, instead of utilizing RFID tags, time cards 110 may be imprinted with bar codes that reflect a unique identifier. In such an environment, the RFID circuit 245 may be replaced with a bar code reader (not shown) that is able to scan and read bar codes in proximity to the digital time clock. As a time card imprinted with a bar code is inserted into the mechanical time clock, the time card would be detected and the bar code reader would read the code from the time card. The digital time clock may be cycled from a quiescent state to an operational state to save power during periods in which a time card is not detected.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:
1. A digital time clock for operation in conjunction with a mechanical time clock, the digital time clock comprising:
   a power supply for supplying power to the digital time clock;
   a time base for generating an indication of time;
   a storage area for storing data;
   a card detection component for detecting the presence of a time card near a mechanical time clock, wherein the digital time clock is cycled from a quiescent state that draws low power from the power supply to an operational state when the time card is detected; and
   a bar code reader that, when the digital time clock is in the operational state, reads an identifier from a bar code that is associated with the time card and stores the identifier and a time from the time base reflecting the detection of the time card in the storage area.

2. The digital time clock of claim 1, wherein the power supply is a battery.

3. The digital time clock of claim 1, wherein the time base is a counter that is incremented at fixed intervals.

4. The digital time clock of claim 1, wherein the time base is a clock.

5. The digital time clock of claim 1, wherein the card detection component is a photosensor.

6. The digital time clock of claim 1, wherein the card detection component is a transponder that emits a signal and detects a reflected echo signal from the time card.

7. The digital time clock of claim 1, wherein the card detection component is a switch that is triggered by the insertion of the time card into the mechanical time clock.

8. The digital time clock of claim 1, wherein the card detection component is an inductive sensor that detects the operation of the mechanical time clock.

9. The digital time clock of claim 1, wherein the bar code is imprinted on the time card.

10. The digital time clock of claim 1, further comprising a mounting component to secure the digital time clock to the mechanical time clock.

11. The digital time clock of claim 10, wherein the mounting component includes a locking mechanism to prevent the digital time clock from being removed from the mechanical time clock without a corresponding unlocking mechanism.

12. The digital time clock of claim 1, wherein the digital time clock is incorporated in a housing of the mechanical time clock.

13. The digital time clock of claim 1, further comprising a port that is coupled to the storage area and which is coupleable to a computer so that data stored in the digital time clock may be downloaded to the computer.

14. The digital time clock of claim 1, further comprising a wireless transmitter coupled to the storage area so that data stored in the digital time clock may be wirelessly transmitted to a computer.

15. The digital time clock of claim 1, further comprising a network transmitter coupled to the storage area so that data stored in the digital time clock may be transmitted to a computer via a network.

16. A digital time clock for operation in conjunction with a mechanical time clock, the digital time clock comprising:
a time base for generating an indication of time;
a bar code reader that, when the digital time clock is in proximity to a mechanical time clock, reads an identifier from a bar code that is associated with a time card being inserted into the mechanical time clock; and
a communications component that communicates to a remote computer, for each time card that is inserted into the mechanical time clock, the identifier and a time from the time base reflecting the insertion of the time card into the mechanical time clock.

17. The digital time clock of claim 16, further comprising a power supply for supplying power to the digital time clock.

18. The digital time clock of claim 17, wherein the power supply is a battery.

19. The digital time clock of claim 16, wherein the time base is a counter that is incremented at fixed intervals.

20. The digital time clock of claim 16, wherein the time base is a clock.

21. The digital time clock of claim 16, further comprising a card detection component for detecting the presence of a time card near the mechanical time clock, the card detection component causing the bar code reader to read a bar code that is associated with the time card when the presence of the time card is detected.

22. The digital time clock of claim 21, wherein the card detection component is a photosensor.

23. The digital time clock of claim 21, wherein the card detection component is a transponder that emits a signal and detects a reflected echo signal from the time card.

24. The digital time clock of claim 21, wherein the card detection component is a switch that is triggered by the insertion of the time card into the mechanical time clock.

25. The digital time clock of claim 21, wherein the card detection component is an inductive sensor that detects the operation of the mechanical time clock.

26. The digital time clock of claim 16, wherein the bar code is imprinted on a time card.

27. The digital time clock of claim 16, further comprising a mounting component to secure the digital time clock to the mechanical time clock.

28. The digital time clock of claim 27, wherein the mounting component includes a locking mechanism to prevent the digital time clock from being removed from the mechanical time clock without a corresponding unlocking mechanism.

29. The digital time clock of claim 16, wherein the digital time clock is incorporated in a housing of the mechanical time clock.

30. The digital time clock of claim 16, wherein the communications component comprises:
a storage area for storing, for each time card, data comprising the identifier and the time from the time base reflecting the insertion of each time card into the mechanical time clock; and
a port that is coupled to the storage area and which is coupleable to the remote computer so that data stored in the digital time clock may be downloaded to the remote computer when the digital time clock is transported to the remote computer.

31. The digital time clock of claim 16, wherein the communications component comprises a wireless transmitter for wirelessly transmitting, for each time card, the identifier and the time from the time base reflecting the insertion of the time card into the mechanical time clock to the remote computer.

32. The digital time clock of claim 16, wherein the communications component comprises a transmitter coupled to a wired network for transmitting, for each time card, the identifier and the time from the time base reflecting the insertion of the time card into the mechanical time clock to the remote computer.

33. A digital time clock for operation in conjunction with a mechanical time clock, the digital time clock comprising:
a time base for generating an indication of time;
a reader component that, when the digital time clock is in proximity to a mechanical time clock, reads an identifier that is associated with a time card being inserted into the mechanical time clock;
a communications component that communicates to a remote computer, for each time card that is inserted into the mechanical time clock, the identifier and a time from the time base reflecting the insertion of the time card into the mechanical time clock; and
a trigger generation circuit that, after the reader component reads an identifier that is associated with a time card being inserted into the mechanical time clock, transmits a trigger signal to a remote device.

34. The digital time clock of claim 33, wherein the remote device is a computing device and the trigger signal causes the initiation of a process that is associated with the clocking in or clocking out of an employee.

35. The digital time clock of claim 33, wherein the remote device is a door lock and the trigger signal causes a door to unlock.

36. The digital time clock of claim 33, wherein the remote device is a door lock and the trigger signal causes a door to lock.

37. The digital time clock of claim 33, wherein the remote device is a camera and the trigger signal causes the camera to be enabled.

38. A digital time clock for operation in conjunction with a mechanical time clock, the digital time clock comprising:
   a time base for generating an indication of time;
   a radio frequency identification tag reader that, when the digital time clock is in proximity to a mechanical time clock, reads an identifier from a radio frequency identification tag that is associated with a time card being inserted into the mechanical time clock;
   a communications component that communicates to a remote computer, for each time card that is inserted into the mechanical time clock, the identifier and a time from the time base reflecting the insertion of the time card into the mechanical time clock; and
   a radio frequency identification tag writer that, when the radio frequency identification tag is a read/write radio frequency identification tag, directs the read/write radio frequency identification tag to store data.

39. The digital time clock of claim 38, wherein the stored data comprises a representation of a time from the time base reflecting the insertion of the time card into the mechanical time clock.

* * * * *